July 14, 1970 W. ENGELBRECHT 3,520,217
TOOL MOUNT FOR TURNING LATHES
Filed March 20, 1967 5 Sheets-Sheet 4

INVENTOR:
Wilhelm Engelbrecht
by Michael S. Striker

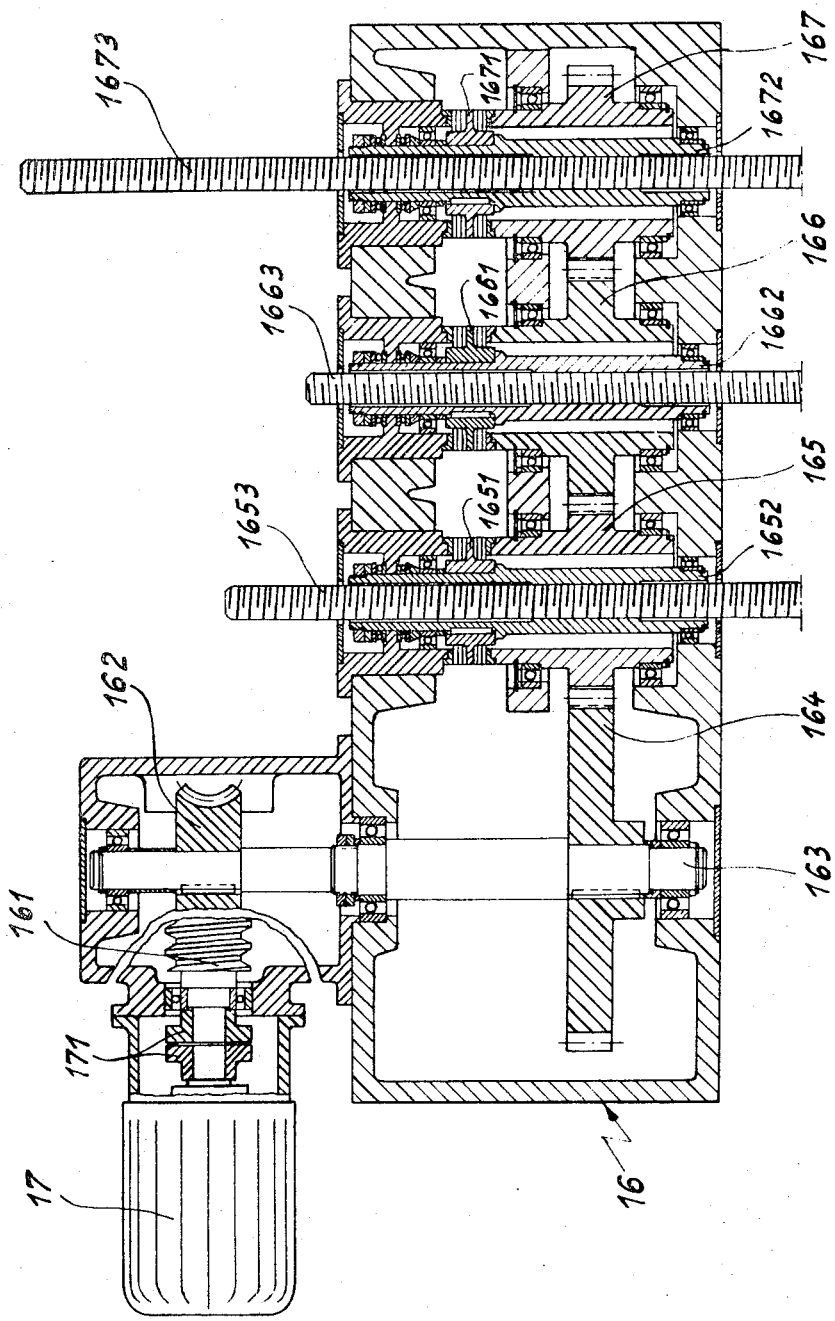

United States Patent Office 3,520,217
Patented July 14, 1970

3,520,217
TOOL MOUNT FOR TURNING LATHES
Wilhelm Engelbrecht, Dortmund-Kirchhorde, Germany, assignor to Hoesch Maschinenfabrik Deutschland AG, Dortmund, Germany
Filed Mar. 20, 1967, Ser. No. 624,285
Claims priority, application Germany, July 9, 1966, H 59,905
Int. Cl. B23b 21/00
U.S. Cl. 82—24     12 Claims

ABSTRACT OF THE DISCLOSURE

A tool mount for use in heavy-duty turning lathes wherein one or more tool blocks rest on an extension of the support and can reciprocate toward or away from the axis of the revolving workpiece. Each tool block is in full surface-to-surface contact with the extension, also in the fully extended position of the corresponding turning tool, so that the bed which carries the tool block support can take up all cutting forces.

BACKGROUND OF THE INVENTION

The present invention relates to machine tools in general, and more particularly to an improved tool carrying structure (hereinafter called tool mount) which can be used with advantage in heavy-duty rough-turning or finish-turning lathes.

In heavy-duty turning lathes, the tools are often fed through considerable distances, for example, when a tool must form a deep circumferential groove in the periphery of a revolving large-diameter workpiece. Thus, the tool must travel a considerable distance from its retracted or starting position (when its tip is about to engage the workpiece) to its fully extended position when the tip is closest to the axis of the workpiece. Therefore, the tool holder must project well beyond its support when the tool assumes its fully extended position. When the tool assumes such extended position, it tends to vibrate and, in order to avoid tool breakage, it is customary to reduce the rate of feed toward the end of a material-removing operation. Vibration is also reduced if the operator places a so-called chisel prop below the turning tool. However, even if the prop is bolted to the vertical surface of the tool block support adjacent to the workpiece and extends into a horizontal groove of the tool block support or bears against a suitable supporting surface of the support, vibrations of the tool are somewhat reduced but cannot be suppressed in their entirety. This is due to the fact that a certain small freedom of movement (also called breathing clearance) of the chisel prop relative to the tool block support and/or between the tool and the chisel prop is unavoidable and the tool block will vibrate whenever the tip of a turning tool engages and removes the material of the workpiece. Additional problems arise when the block of a fully extended tool extends well beyond its carriage because the block then tends to yield laterally to an extent which depends on the wear upon the tip of the tool and on the rate at which the tool is being fed against the workpiece. Lateral displacements of the tool block are normally counteracted by inserts which are slidable in parallelism with the direction of tool feed and can be provided at the one or both sides of the tool block. The inserts are coupled to the tool block by separate clamping devices. A serious drawback of such constructions is that the insertion or removal of a tool block requires too much time, particularly in a heavy-duty turning lathe. Moreover, the tool block must be very large and heavy so that manual withdrawal or reinsertion of tools necessitates the exertion of a considerable force. Furthermore, the transfer of cutting forces from the structure in which the tool block is mounted to the base or bed of the turning lathe is unsatisfactory.

Accordingly, it is an important object of the present invention to provide a novel and improved tool mount which can support one, two or more relatively movable tool blocks and can be used with particular advantage in heavy-duty rough-turning or finish-turning lathes to properly support the tool blocks during engagement between the workpiece and the respective tools.

Another object of the invention is to provide a tool mount which is particularly suited for satisfactory retention and holding of tool blocks which must be moved through considerable distances in order to feed their tools from initial engagement with a workpiece to a position in which the tool has been advanced to a position nearest to the axis of the workpiece.

A further object of the present invention is to provide a tool mount wherein each tool block can be rapidly advanced to or from extended position, wherein the tools are accessible at all times, wherein the tools are held against vibration when in partially or in fully extended position, and which can be installed in many types of presently known heavy-duty turning lathes.

A concomitant object of the invention is to provide a tool mount wherein the tool blocks can be fed at a constant rate regardless of the distance between the tips of their tools and the axis of the workpiece, wherein the tool blocks can be withdrawn or reinserted with little loss in time, and wherein the tool blocks can be displaced either by hand, by manually controlled power drives, or by automatic programming systems.

Still another object of the invention is to provide a novel tool block support which can be used in a tool mount of the above outlined characteristics.

An additional object of the invention is to provide a tool block support which can accommodate one, two or more tool blocks, which can accommodate two or more identically or differently dimensioned blocks, and which can be used with equal advantage in lathes for overhead or normal turning.

SUMMARY OF THE INVENTION

One feature of my invention resides in the provision of a tool mount which is particularly suited for use in heavy-duty rough-turning or finish-turning lathes wherein the workpiece rotates in a predetermined direction about a predetermined axis. The tool mount comprises a support which is preferably constituted by a slidable carriage and is laterally adjacent to the axis of rotation of the workpiece, an extension which is integral with the support and extends toward the axis of the workpiece so that it may actually underlie a portion of the workpiece, at least one tool block one surface of which is fully supported by and is reciprocable along the extension toward and away from the axis of the workpiece, a tool mounted on the tool block and movable therewith into material-removing engagement with the workpiece to thereby transmit to the extension cutting forces through the intermediary of the tool block, and a base structure which supports the extension and is arranged to take up the cutting forces.

When the direction of rotation of the workpiece is such that it automatically urges the bottom surface of the tool block against the adjoining surface of the extension, the tool block need not be positively locked to but can be merely biased against the support. When the workpiece rotates in the opposite direction, the front portion of the tool block can be positively locked to the extension by a suitable locking device which is reciprocable along the extension in parallelism with the direction of movement of the tool block.

The tool mount can comprise two or more tool blocks which are reciprocable with or relative to each other, either by hand, by a manually operated motor, or by an automatic programming system.

The novel features which are considered as characteristic of the invention are set forth in particular in the appended claims. The improved tool mount itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a sectional view as seen in the direction of arrows from the line VI—VI of FIG. 3.

DESCRIPTION OF THE PREFERRED EMBODIMENTS

Figure 1:
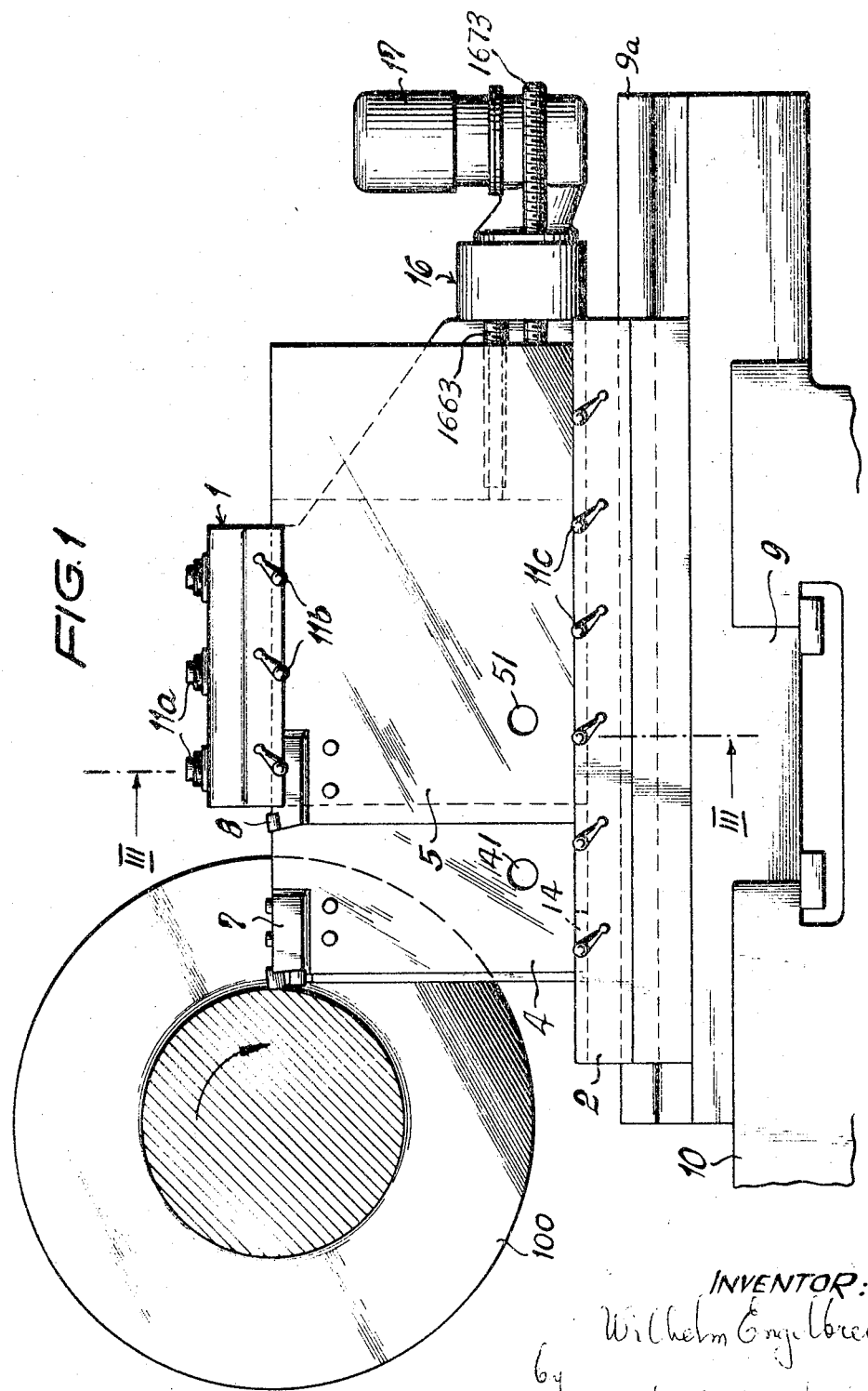
FIG. 1 is a side elevational view of a tool mount which embodies one form of my invention, further showing a workpiece in section taken in a plane at right angles to the axis of rotation of the workpiece.
Figure 2:
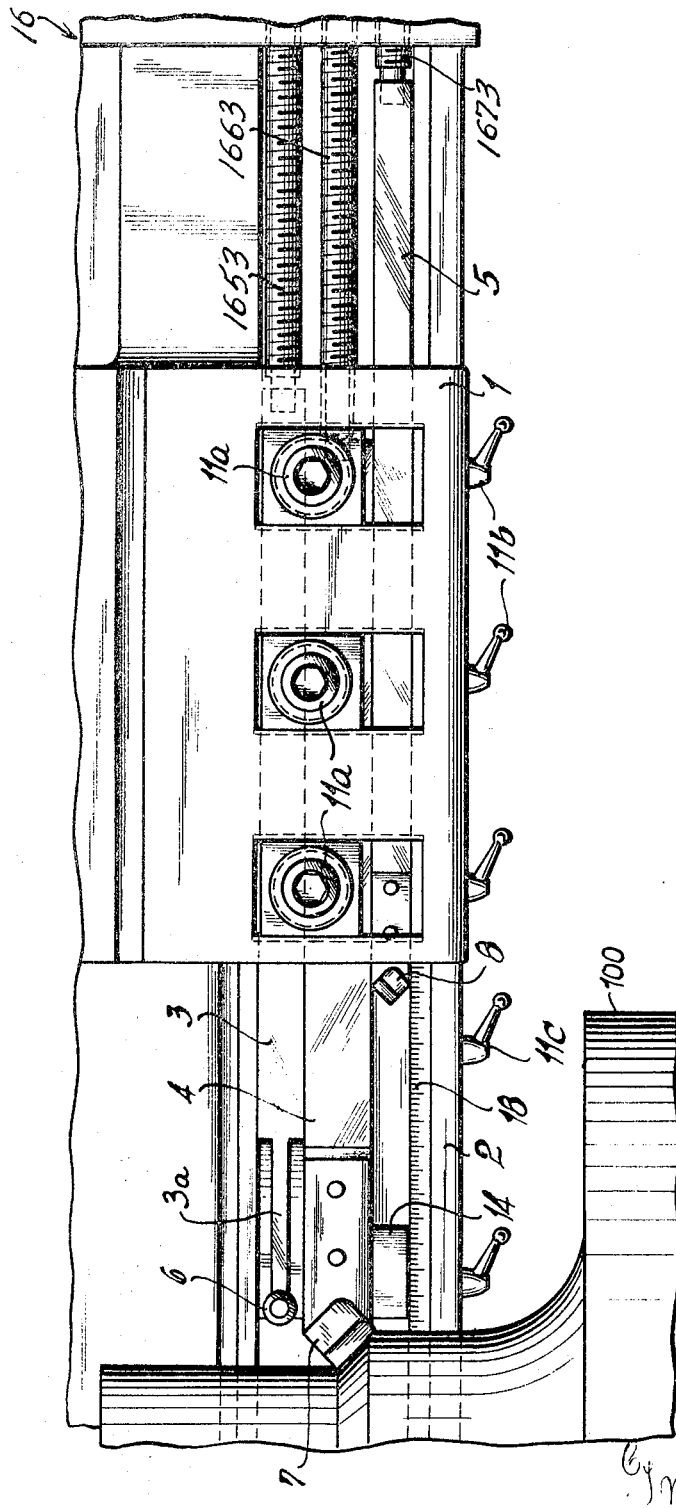
FIG. 2 is a top plan view of the tool mount.
Figure 3:
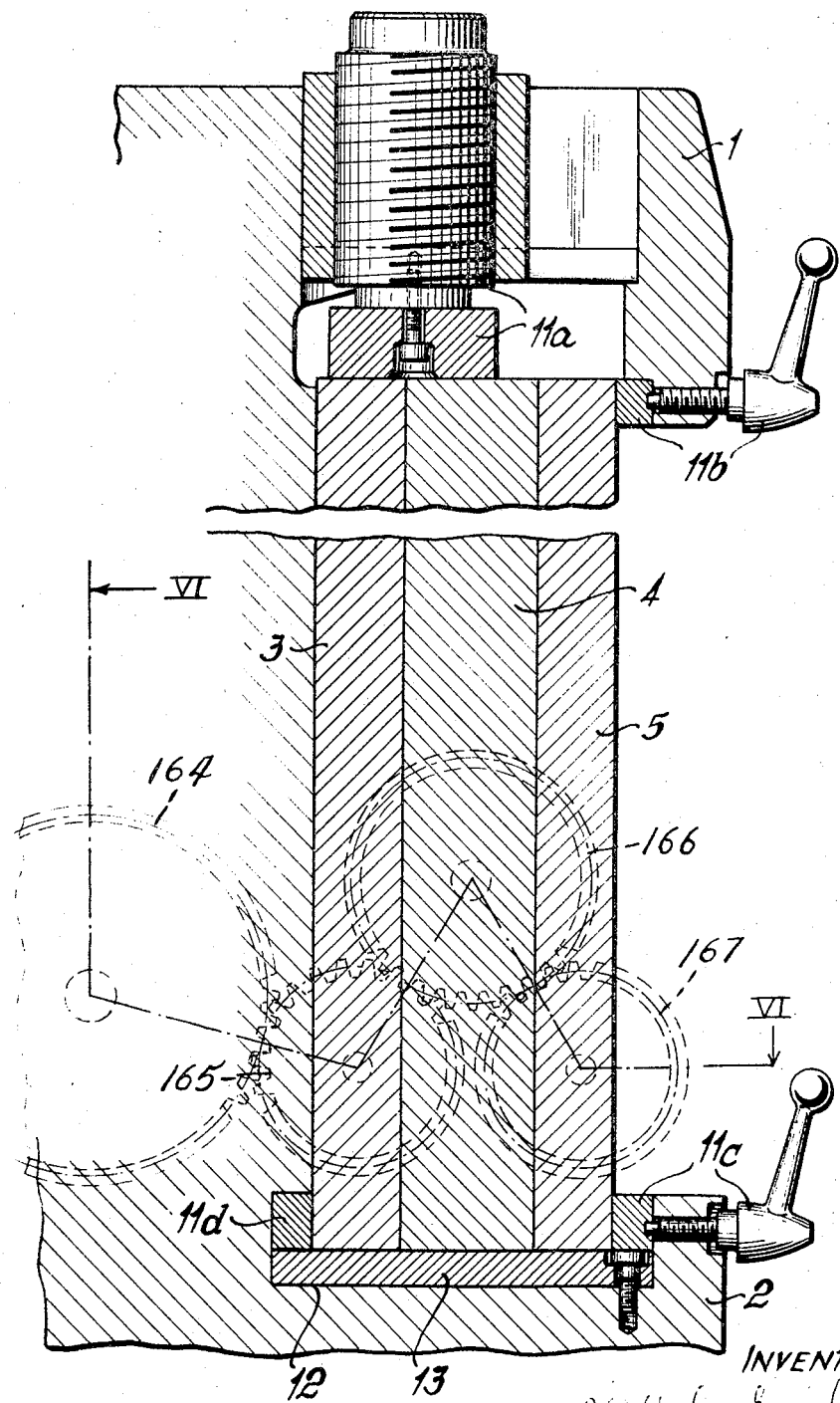
FIG. 3 is an enlarged fragmentary transverse sectional view of the tool mount as seen in the direction of arrows from the line III—III of FIG. 1.

Referring first to FIGS. 1 to 3, there is shown a tool mount which can be used in a heavy-duty rough-turning or finish-turning lathe. The workpiece 100 is mounted for rotation about a horizontal axis which is normal to the plane of FIG. 1, and the drive (not shown) for the workpiece is arranged to rotate the latter in a clockwise direction, as viewed in FIG. 1. The tool mount comprises a base structure including a stationary bed 10 provided with ways for a slide 9 which is movable in parallelism with the axis of the workpiece 100. The slide 9 is provided with ways 9a for an upper carriage or support 1 having a bottom portion or extension 2 which is reciprocable along the ways 9a toward and away from the axis of the workpiece 100. The extension 2 is integral with the remainder of the support 1 which latter is preferably produced by casting. The purpose of the extension 2 is to support, at least from below, three elongated bar-shaped metallic tool blocks 3, 4, 5 which are reciprocable toward and away from the axis of the workpiece 100 and respectively carry detachable material-removing tools 6, 7, 8. FIGS. 1 and 2 show the median tool 7 in actual material-removing engagement with the workpiece 100, and it will be seen that the cutting forces developing during removal of material from the workpiece are transmitted to the tool block 4 whose underside is in full surface-to-surface contact with the extension 2 so that the extension can transmit such forces to the base structure including the slide 9 and bed 10. The cutting forces are transmitted in the same way regardless of which of the tools 6–8 is moved into engagement with the workpiece 100. The underside of each block rests on the extension 2 along its full length, at least when the respective tool is fed to its fully extended position, i.e., to the leftmost position, as viewed in FIG. 1 or 2.

As stated before, each of the three tool blocks 3–5 is reciprocable independently of or together with the other two tool blocks. During such reciprocatory movement, their bottom surfaces slide along a substantially plate-like liner 13 which consists of hardened metallic material and is fixedly mounted in a horizontal guide channel 12 of the extension 2. The channel 12 extends along the full length of the extension 2 so that each of the tool blocks 3–5 can be moved between a fully retracted position (see the position of the tool block 5 in FIG. 2) and a fully extended position in which the corresponding tool 6, 7 or 8 removes material from the workpiece 100.

The support 1 carries a plurality of clamping and guiding devices 11a, 11b, 11c, 11d which can serve as lateral guides for the two outer tool blocks 3, 5 (see the devices 11c, 11d in the groove 12 shown in FIG. 3), to clamp the top surface of a tool block and to thereby press the bottom surface of such block against the liner 13 (see the clamping device 11a of FIG. 3), and to prop a tool block laterally at a point adjacent to its top surface (see the lateral guiding device 11b of FIG. 3). The clamping and guiding devices 11a–11c are adjustable by means of suitable spindles and/or by manually operable handles, and can be applied with requisite force subsequent to longitudinal displacement of tool blocks 3–5 to desired positions with reference to each other and relative to the workpiece 100.

The tools 6–8 are mounted on the top left-hand corner portions of the tool blocks, as viewed in FIG. 1. Each of these tools is fitted into a suitable recess or cutout of the respective tool block and is securely affixed thereto by means of bolts, rivets, screws or analogous fasteners. The width of the tool blocks 3–5, as seen in the axial direction of the workpiece 100, may but need not be identical. As shown in FIG. 2, the width of the median tool block 4 exceeds considerably the width of the other two tool blocks, but the width of the tool block 5 is only slightly less than that of the tool block 3. The height of each tool block, as seen in a direction at right angles to its bottom surface, exceeds its width so that the tool blocks can withstand considerable bending stresses which arise when the respective tools move into actual material-removing engagement with the workpiece 100.

The width of the tool 6 is less than the width of the corresponding tool block 3; therefore, the latter comprises a narrowed front portion 3a whose width is less than the width of the tool 6, and the latter is connected with the block portion 3a.

FIG. 2 shows that the tool 7 of the median tool block 4 is in material-removing engagement with the revolving workpiece 100. The block 4 is supported laterally by the tool block 3 and by a suitable fitting 14 which engages its side face opposite the tool block 3. If possible, the median tool block 4 can be propped at both sides solely by the adjoining tool blocks 3, 5 so that the fitting or fittings 14 can be removed. The fitting 14 of FIG. 2 is received in the channel 12 in front of the tool 8 which is held in fully retracted position.

When the tool mount of my invention comprises two or more tool blocks, the tools 6–8 are attached to such tool blocks prior to begin of a rough-turning or finish-turning operation, and the tools are thereupon moved into engagement with the workpiece 100 in any desired sequence, either by hand, by means of a manually operated power drive, or by resorting to a suitable programming system. FIGS. 1 and 2 show a power drive 16 which can reciprocate the tool blocks 3–5 through the intermediary of spindles or feed screws 1653, 1663, 1673. The tool mount can be equipped with hand wheels, crank handles or other known hand-operated devices for moving the tool blocks 3–5 relative to each other and/or relative to the extension 2 and workpiece 100.

If the tool mount of my invention is used in a turning lathe whose operation is carried out in accordance with a program, the reference point of each tool must be moved to a predetermined starting position and with utmost accuracy. The power drive 16 then preferably comprises one or more motors 17 which can advance the tool blocks 3–5 in stepwise fashion. It is also advisable to provide a program-operated turning lathe with indicating means for indicating the position of tools 6–8 with reference to the extension 2 and with reference to each other. Such indicating means may include an optical indicating unit or a simple scale 18 (see FIG. 2) which is provided with graduations to facilitate rapid determination of the position of each tool. The extension 2 may carry a separate scale 18 for each of the three tools 6–8.

Figures 4, 5:
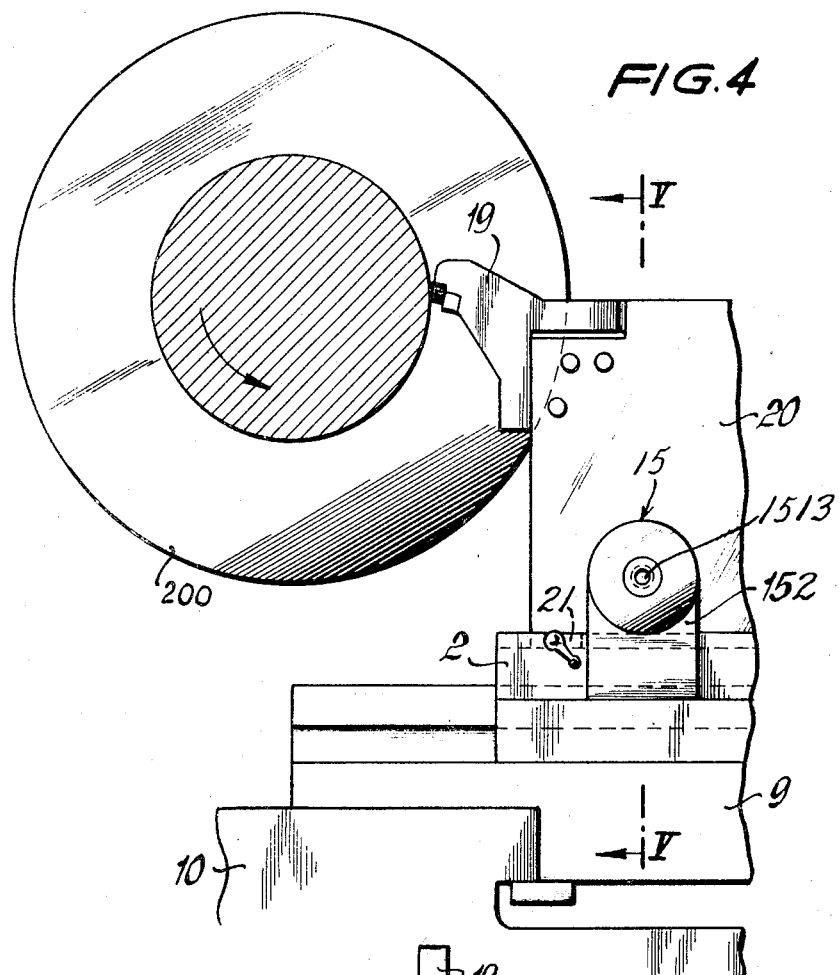
FIG. 4 is a fragmentary side elevational view of a second tool mount which is utilized for overhead turning work.
FIG. 5 is a fragmentary transverse vertical section as seen in the direction of arrows from the line V—V of FIG. 4.

FIG. 6 shows the details of an arrangement which can move the tool blocks 3, 4, 5 independently of each other or simultaneously. In order to adjust the positions of the blocks 3, 4, 5 of FIGS. 1 to 3 with reference to each other or at the same time, the operator first releases the clamping devices 11a, 11b, 11c and removes the bolt or bolts one of which is shown in FIG. 5, as at 151, 1511, 1512. The operator thereupon actuates the power drive 16 whose details are best shown in FIG. 6. This power drive 16 comprises the motor 17 (shown also in FIG. 1) which drives a gear 164 by way of a friction clutch 171, a worm 161, a worm wheel 162 and a worm wheel shaft 163. The gear 164 forms part of a gear train which further includes hollow gears 165, 166, 167 each coaxial with one of the feed screws 1653, 1663, 1673. The feed screws 1653, 1663, 1673 are respectively connected to the tool blocks 3, 4, 5 in such a way that they can move with the respective blocks lengthwise of the liner 13 but cannot rotate. The feed screws respectively mesh with spindle nuts 1652, 1662, 1672 which can be connected to gears 165, 166, 167 by electromagnetic clutches 1651, 1661, 1671. The feed screws 1653, 1673 are provided with right-handed threads and the median feed screw 1663 is provided with left-handed threads to make sure that all of the feed screws (and hence the tool blocks 3–5) will move in the same direction when the clutches 1651, 1661, 1671 are engaged and the motor 17 rotates the gears 164–167.

If the operator decides to engage only one of the clutches 1651, 1661, 1671, the corresponding tool block is moved forwardly or backwards, depending on the direction of rotation of the motor 17, while the remaining two blocks remain idle because the corresponding clutches are not engaged. The operator can engage one, two or all three clutches 1651, 1661, 1671 at a time to thereby move a selected tool block, two tool blocks or all three tool blocks in a given direction. When all of the tool blocks 3–5 assume the desired positions, the clamping devices 11a, 11b, 11c are applied to hold the tool blocks in selected positions and the operators also insert the fitting 14 (if necessary).

If the turning lathe is used for overhead turning work, i.e., if the workpiece 200 (see FIG. 4) is driven in a counterclockwise direction and tends to lift the tool 19 and its block 20 off the extension 2, the tool mount of my invention is preferably provided with a suitable locking or arresting device 15 which is reciprocable lengthwise of a hardened U-shaped liner 13' and can be positively locked to the tool block 20 and support 1 (see FIG. 5) to prevent movement of the bottom surface of the tool block 20 away from the liner 13'. The locking device 15 can be installed in close proximity to the overhead turning tool 19 to prevent lifting of the tool block 20 when the latter is moved to its fully or nearly fully extended position. The lower portion of the locking device 15 is constituted by a slide which is shiftable along ways provided therefor on the extension 2 so that the device 15 can be moved in parallelism with the direction of reciprocatory movement of the tool block 20.

FIGS. 4 and 5 further show an insert or fitting 21 which is analogous to the fitting 14 of FIGS. 1 and 2 and is installed between the left-hand side face of the tool block 20 and a bracket 152. The fitting 21 presses the right-hand side face of the block 20 against the rail of the clamping device 11d and abuts against the rail of the clamping device 11c. This fitting is necessary because the apparatus of FIGS. 4 and 5 is shown as employing a single tool block 20 whose width is less than the distance between the rails of the clamping devices 11c, 11d.

The arresting device 15 is constructed and operates as follows: The front portion of the tool block 20 is formed with a transversely extending hole 201 (FIG. 5) which receives the cylindrical central portion 151 of a locking bolt forming part of the arresting device 15. The central portion 151 has an eccentric pin or post 1511 at one end and an eccentric pin or post 1512 at the other end. The post 1511 has an axially extending recess 1513 of polygonal outline for reception of the working end of a rotating tool (not shown). The post 1512 extends into a cylindrical bore in a bracket 153 which is affixed to the extension 2 and the post 1511 extends into a cylindrical bore of the bracket 152; the latter is also affixed to the extension 2. The axis of the hole 201 in the block 20 is parallel to but does not coincide with the axes of the bores for the posts 1511, 1512. When the apparatus is to be used for overhead work, the locking bolt including the parts 151, 1511, 1512 is inserted into the block 20 and into the brackets 152, 153 in a manner as shown in FIG. 5, and the recess 1513 thereupon receives the working end of a rotating tool which causes the bolt to turn whereby the central portion 151 causes the bottom surface of the block 20 to bear against the liner 13. The thus clamped block 20 can readily withstand stresses which develop when the tool 19 engages a workpiece 200 which is rotated in a counterclockwise direction, as viewed in FIG. 4.

FIG. 1 shows holes 41, 51 which are respectively provided in the lower front portions of the tool blocks 4, 5 and correspond to the hole 201 in FIG. 5.

A very important advantage of my improved tool mount is that each tool block is fully supported by the extension 2, preferably in each position of the respective tool, i.e., regardless of whether the tool is held in a position in which it begins to remove material from a revolving workpiece or in a position at a minimum distance from the workpiece axis. The bottom surface of each tool block remains in continuous contact with the liner 13 or 13'. Therefore, the extension 2 can take up all such cutting forces which develop when the tip of a tool removes material from the workpiece. In addition, the extension 2 can also take up lateral stresses to prevent vibration of the tool in fully or partially extended position. Each tool block is preferably constructed in such a way that it can be connected with two or more different turning tools. The length of the tool blocks is not dependent on the extent of feed movement of the respective tools and/or on the length of the channel 12 in the extension 2, i.e., the length of the tool blocks can be considerably less than the length of the channel 12 and liner 13 or 13'. This reduces the overall weight of the tool blocks and enables the operators to exchange the tool blocks with a minimum of effort.

The machine tool which embodies the tool mount of my invention can be readily combined with a suitable programming system because the tool blocks are movable independently of each other or as a unit. Accurate adjustments in the position of tools 6–8, 19 can be effected by the motor or motors 17 or by hand by referring to graduations of the indicating means 18. The aforementioned clamping and guiding devices 11a–11d can be operated by hand or automatically.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A tool mount, particularly for use in heavy-duty rough-turning and finish-turning lathes wherein a workpiece rotates in a predetermined direction about a predetermined axis, comprising a support laterally adjacent to said axis and having an upright portion having a side face in a plane substantially normal to said axis, a bottom extension fixed to and projecting with a portion thereof beyond said upright portion towards said axis and having a top face and an overhanging top portion likewise fixed to said upright portion; at least one tool block having a surface fully supported by and being reciprocable along said extension towards and away from said axis; a tool mounted on said block and movable therewith into material-removing engagement with the workpiece to thereby transmit cutting forces to said extension through the intermediary of said tool block; clamping and guiding means provided on said support for said tool block and comprising a first set of clamping means in said overhanging portion for pressing said surface of said tool block towards said top face of said extension and two additional sets of clamping means respectively provided in said over-hanging portion and said extension for pressing a further surface of said tool block opposite said side face of said upright portion toward said side face; and a base structure supporting said extension of said support and arranged to take up said cutting forces.

2. A tool mount as defined in claim 1, wherein said base structure includes a stationary bed and a slide reciprocable on said bed in parallelism with said axis, said support and said extension thereof being reciprocably supported by said slide.

3. A tool mount as defined in claim 1, wherein said extension is provided with a guide channel receiving a portion of said tool block, and wherein one of said additional sets of clamping means being laterally adjacent to said portion of said tool block in said guide channel.

4. A tool mount as defined in claim 3, wherein said extension comprises a liner of hardened metallic material, said liner surrounding at least a portion of said channel.

5. A tool mount as defined in claim 1, comprising a plurality of tool blocks located side by side laterally of said side face and between said overhanging portion and said extension reciprocably supported by and movable along the latter with and relative to each other, said additional sets of clamping means engaging said further surface of the tool block farthest from said side face to thereby clamp all of said side-by-side arranged tool blocks against said side face.

6. A tool mount as defined in claim 5, wherein said tool blocks are of identical width, as considered in the direction of said axis.

7. A tool mount as defined in claim 1, comprising a plurality of adjoining tool blocks movable relative to said extension together with and independently of each other, and drive means for moving said tool blocks relative to said extension.

8. A tool mount as defined in claim 7, wherein said drive means comprises at least one motor.

9. A tool mount as defined in claim 1, wherein said tool block resembles an elongated bar of polygonal outline whose width, as seen in the direction of said axis, is less than the height thereof, as considered in a direction at right angles to said surface.

10. A tool mount as defined in claim 1, wherein said extension forms an integral part of said support, said surface of said tool block being in full surface-to-surface engagement with said extension when the tool assumes a position at a minimum distance from said axis.

11. A tool mount as defined in claim 5, wherein said extension is provided with a guide channel receiving portions of said tool blocks, one of said additional sets of clamping means being laterally adjacent to said portion of said tool blocks in said guide channel, and including at least one fitting in said channel in the region of action of one clamping means of said one additional set of clamping means to support one of said tool blocks at one side during engagement of the tool thereon with the workpiece and while a tool block adjacent said one block is withdrawn relative to the latter in direction away from the axis of the workpiece.

12. A tool mount as defined in claim 1, further comprising arresting means on said projecting portion of said extension for holding a portion of said tool block which is nearer to said axis than said upright portion of said support against movement of said surface away from said extension.

References Cited

UNITED STATES PATENTS

| | | | |
|---|---|---|---|
| 1,724,285 | 8/1929 | King | 82—25 |
| 2,632,332 | 3/1953 | Biggert | 82—24 XR |
| 3,168,846 | 2/1965 | Binns | 82—24 XR |

FOREIGN PATENTS

| | | |
|---|---|---|
| 523,232 | 10/1953 | Belgium. |
| 479,252 | 10/1929 | Germany. |
| 1,017,435 | 10/1957 | Germany. |

LEONIDAS VLACHOS, Primary Examiner